United States Patent
Oosterhouse et al.

(10) Patent No.: US 12,348,885 B2
(45) Date of Patent: Jul. 1, 2025

(54) IMAGE PROCESSING FOR PIXEL CORRECTION

(71) Applicant: Gentex Corporation, Zeeland, MI (US)

(72) Inventors: Andrew J. Oosterhouse, Hudsonville, MI (US); Dale M. Radcliff, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 100 days.

(21) Appl. No.: 18/221,930

(22) Filed: Jul. 14, 2023

(65) Prior Publication Data

US 2024/0031696 A1 Jan. 25, 2024

Related U.S. Application Data

(60) Provisional application No. 63/390,760, filed on Jul. 20, 2022.

(51) Int. Cl.
*H04N 25/68* (2023.01)
*H04N 23/84* (2023.01)

(52) U.S. Cl.
CPC ............. *H04N 25/68* (2023.01); *H04N 23/84* (2023.01)

(58) Field of Classification Search
CPC ........ H04N 25/68; H04N 23/84; H04N 23/80; H04N 23/81; H04N 23/843; H04N 25/683

USPC .......................................................... 348/246
See application file for complete search history.

(56) References Cited

U.S. PATENT DOCUMENTS

| | | | |
|---|---|---|---|
| 2002/0196354 A1* | 12/2002 | Chang | H04N 25/683 348/E5.081 |
| 2005/0058362 A1 | 3/2005 | Kita | |
| 2005/0195297 A1 | 9/2005 | Kita | |
| 2007/0297692 A1* | 12/2007 | Hamatani | G09G 3/20 382/282 |
| 2012/0113266 A1 | 5/2012 | Golan et al. | |
| 2012/0250994 A1 | 10/2012 | Shinozaki et al. | |
| 2013/0070128 A1 | 3/2013 | Suzuki et al. | |
| 2016/0142658 A1* | 5/2016 | Cho | H04N 25/683 348/246 |

* cited by examiner

*Primary Examiner* — Lin Ye
*Assistant Examiner* — Chan T Nguyen
(74) *Attorney, Agent, or Firm* — Price Heneveld LLP; Brian James Brewer

(57) ABSTRACT

A method for correcting image data includes receiving image data associated with an image captured by a photosensor array and determining a location of a target pixel in the photosensor array associated with a defect of the imager. First operating pixels are identified in a first region of the photosensor array that overlaps the location of the target pixel and second operating pixels are identified in a second region of the photosensor array that overlaps the location of the target pixel and a portion of the first region. A simulated pixel value is determined for the target pixel in response to a weighted average of the first operating pixels and the second operating pixels. The simulated pixel value is assigned to the target pixel in the image data.

18 Claims, 3 Drawing Sheets

IMAGE PROCESSING FOR PIXEL CORRECTION

CROSS-REFERENCE TO RELATED APPLICATIONS

This application claims priority under 35 U.S.C. § 119(e) and the benefit of U.S. Provisional Application No. 63/390,760 entitled IMAGE PROCESSING FOR PIXEL CORRECTION, filed on Jul. 20, 2022, by Andrew Oosterhouse, et al., the entire disclosure of which is incorporated herein by reference.

TECHNOLOGICAL FIELD

The present disclosure relates generally to an image processing technique for pixel correction and, more particularly, to an image processing technique to correct pixels associated with defective regions of an imager.

SUMMARY OF THE DISCLOSURE

According to one aspect of the present disclosure, a method for correcting pixels of a display includes receiving, at a processor, image data associated with an image captured by an imager. The method further includes determining, by the processor, a location of a target pixel in the display associated with a defect of the imager. The method further includes identifying operating pixels proximate to the target pixel. The operating pixels have a color common to the target pixel. The method further includes applying a kernel to a first region of the image data that overlaps the location of the target pixel. The method further includes calculating a sum of at least one value for each of the operating pixels in the first region, and storing, in a memory, the sum and a count of the operating pixels in the first region. The method further includes applying the kernel to a second region of the image data that overlaps the location of the target pixel. The method further includes determining a weighted average of the operating pixels based on the sum, the count of the operating pixels in the first region, and the values of the operating pixels in the second region. The method further includes applying a correction to the target pixel based on the weighted average.

According to another aspect of the present disclosure, a system for correcting image data includes an imager configured to capture image data. A display is configured to present the image data. An image processor is in communication with the display and the imager. The image processor is configured to receive the image data, determine a location of a target pixel in the display associated with a defect of the imager, and identify operating pixels proximate to the target pixel. The operating pixels have a color common to the target pixel. The image processor is further configured to apply a kernel to a first region of the image data that overlaps the location of the target pixel, calculate a sum of at least one value for each of the operating pixels in the first region, and store, in a memory, the sum and a count of the operating pixels in the first region. The image processor is further configured to apply the kernel to a second region of the image data that overlaps the location of the target pixel. The image processor is further configured to determine a weighted average of the operating pixels based on the sum, the count of the operating pixels in the first region, and the values of the operating pixels in the second region, and apply a correction to the target pixel based on the weighted average.

These and other features, advantages, and objects of the present device will be further understood and appreciated by those skilled in the art upon studying the following specification, claims, and appended drawings.

DETAILED DESCRIPTION OF EMBODIMENTS

Figure 2:
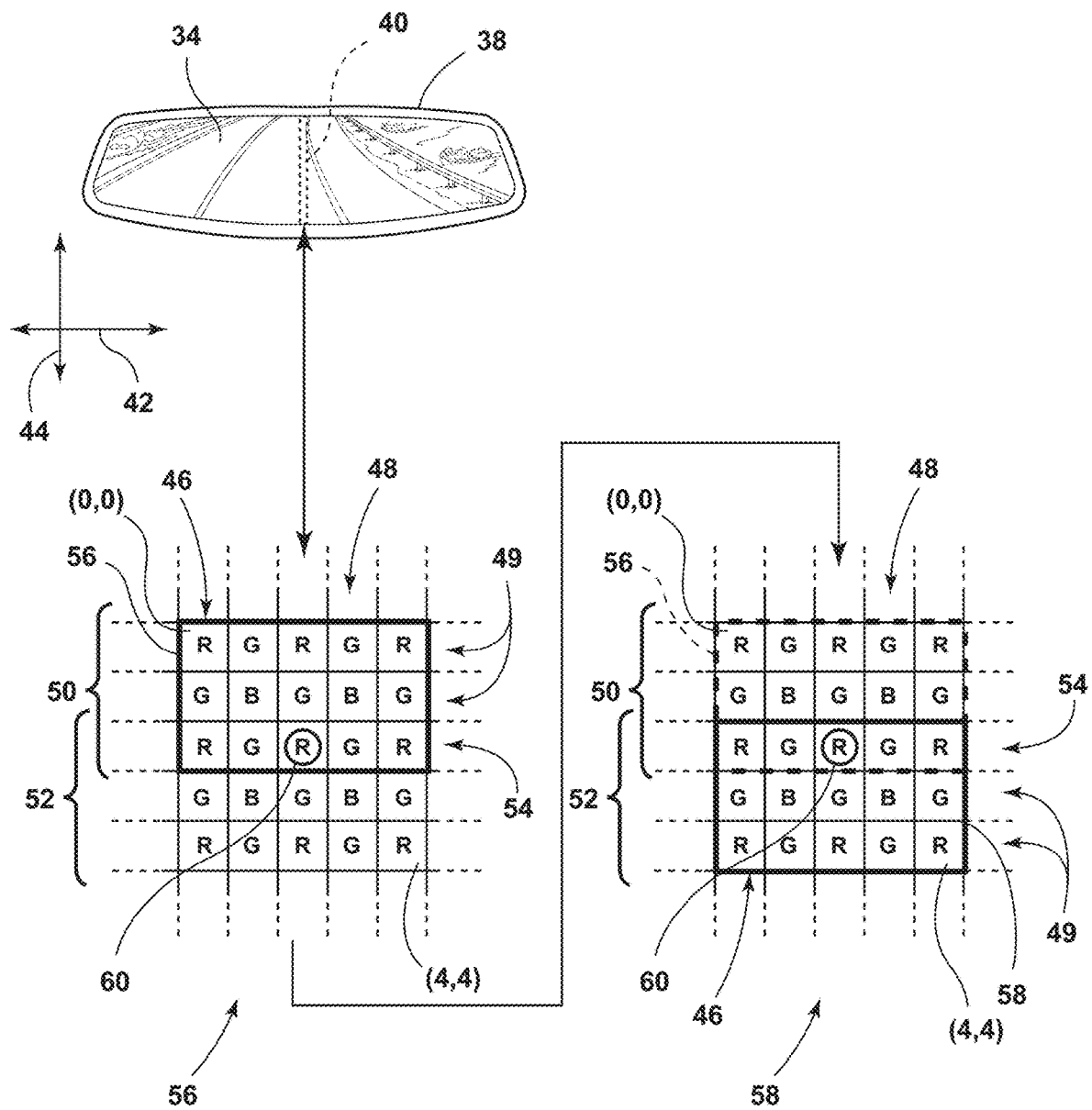
FIG. 2 is a front view of pixel data displayed at a rearview assembly of the present disclosure, along with detailed views of the pixel data displayed.

For purposes of description herein, the terms "upper," "lower," "right," "left," "rear," "front," "vertical," "horizontal," and derivatives thereof shall relate to the invention as oriented in FIG. 2. Unless stated otherwise, the term "front" shall refer to the surface of the element closer to an intended viewer of a display mirror, and the term "rear" shall refer to the surface of the element further from the intended viewer of the display mirror. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

The present disclosure generally provides for an image processing apparatus that manipulates image data captured by an imaging device. In operation, the image processing apparatus may produce a corrected image to mask or conceal a defective or dead portion (e.g., pixels or segments) of an image sensor of the imaging device from display on a display screen. The processes employed by the image processing apparatus may provide reduced memory requirements while also gathering sufficient data to adequately adjust a pixel associated with the defective portion of the image sensor. In general, the image processing apparatus may implement pixel correction over a given region of an image (e.g., a 5×5 pixel area) using two line buffers in a single scan. Thus, the implementation of the present disclosure may limit the line buffers necessary to process and correct image data in a given region that is captured by a defective of malfunctioning image sensor. For example, the disclosure may provide for the use of two-line buffers rather than four-line buffers to cover a 5×5 pixel area that includes a "dead" pixel. In this way, the image processing apparatus of the present disclosure may provide for a more robust and cost effective technique for producing accurate images from inaccurate or defective image sensors.

Figure 1:
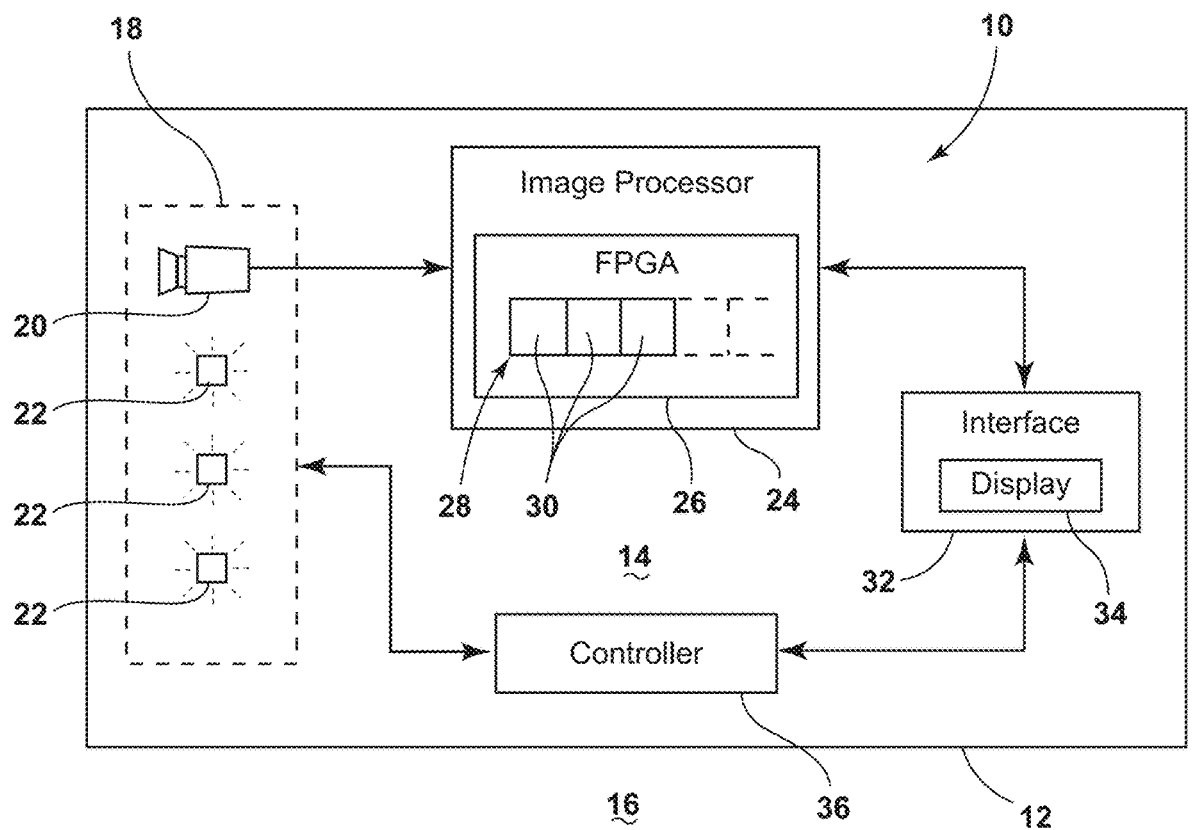
FIG. 1 is a block diagram of an image processing system of the present disclosure.

Referring now to FIG. 1, an image processing system 10 is shown implemented in a simplified schematic structure representing a vehicle 12. Though discussed in reference to the vehicle 12 (e.g., an automotive vehicle, aircraft, bus, train, etc.), the system 10 may be implemented with various camera or imaging systems, which may be applied in portable devices as well as fixtures to suit a variety of applications. In the particular example shown, the system 10 may be configured to process images of an interior 14 or an exterior 16 of the vehicle 12. Accordingly, the disclosure may provide for a flexible image processing system 10 suited to a variety of applications.

The system 10 may include an imaging apparatus 18 comprising an imager 20 and, in some cases, one or more illumination source(s) 22 for illuminating a spatial region that is within a field of view of the imager 20. In operation, the imager 20 may capture the image data and supply the data to one or more displays. In some cases, the imager 20 may suffer one or more faults resulting from manufacturing issues or wear attributable to use. For example, due to the variations in operating environment, vibrations, etc., the imager 20 and corresponding components may be susceptible to damage and defects including one or more dead or defective pixels of a photosensor or photodiode array (e.g., CMOS, charge coupled, etc.). In operation, such "dead" or defective photo-sensor pixels may be identified by the controller 36 based on the corresponding pixel data read out from the pixel array 48. In various implementations, the disclosure may provide for the detection and correction of such defects by means of simulating the pixel data associated with the defective pixel(s) and displaying corrected image data that corrects and removes visible blemishes associated with the defective pixel(s). In this way, the system 10 may prolong the operation of the imager 20 by enhancing the image data to prolong the corresponding service life and reduce repair costs.

The imager 20 may include an image sensor comprising a plurality of pixels, such as a CMOS photodiode array configured to produce characteristic electrical signals corresponding to wavelengths of light received by the image sensor. The imager 20 may be in communication with an image processor 24 that processes the images in a field-programmable gate array (FPGA) 26. The FPGA 26 includes block random-access memory (BRAM) 28 that may include individual blocks 30 for storing embedded memory in the FPGA 26. Each block 30 may have a predefined storage space (e.g., 4, 8, 16, 32 kilobits, etc.). In general, values associated with the image data (e.g., the characteristic electrical signals) may be stored by the BRAM 28 in the blocks 30 on a frame-by-frame basis. Additionally, in some examples, the BRAM 28 may store a plurality of previous lines and a current frame of the image data to allow for manipulation of the image data based on previously captured lines.

Still referring to FIG. 1, an interface 32, such as a human-machine interface (HMI), a touchscreen, a heads-up display, or the like, may be in communication with the image processor 24 and may be configured to output the image data to a display 34 of the interface 32. For example, as will be described in reference to FIG. 2, the interface 32 may stream video or image data captured by the imager 20 on a display 34 of a rearview assembly with the image data and/or the video data being representations of the interior 14 or exterior 16 of the vehicle 12. The display 34 may include light-emitting diodes, a liquid-crystal display (LCD), or another type of display that employs pixels to present colors with various intensities to form images at the display 34. For example, the display 34 may be an RGB display 34 (e.g., a display having red, green, and blue pixels arranged in an array) that corresponds to the image data captured by photosensors of the imager 20. In some examples, the pixels correlate or generally correspond to a square grid of photosensors of the imager 20. In particular, the pixels may correspond to a group of photosensors that align with a Bayer filter that arranges RGB color filters over the photosensors. In this way, each photosensor of the imager 20 may be assigned to a given wavelength, or color, of visible light, the brightness or intensity of which may be processed by the image processor 24. The image processor 24 may, in turn, communicate the image data associated with that photosensor to a specific pixel mapped to that photosensor. As will be further described, the image data may be manipulated by the image processor 24 prior to determining the pixel data for the individual pixels.

Still referring to FIG. 1, the image processing system 10 may further include a controller 36 in communication with the interface 32 and the imaging apparatus 18. The controller 36 may include a processor and a memory. The memory may store instructions that, when executed by the processor, causes the processor to control the illumination sources 22 and/or the imager 20. For example, the controller 36 may control a shutter of the imager 20 and/or a flashing of the illumination sources 22 or brightness of the illumination sources 22 to enhance the quality of the images captured by the imager 20. The controller 36 may be in communication with other devices not exemplarily illustrated that may correspond to other aspects of the imaging apparatus 18, such as ambient light sensors, infrared sensors, infrared light sources, and the like. Accordingly, the controller 36 may employ other functions related to image capturing and/or illumination not specifically described herein.

Referring now to FIG. 2, the image processing system 10 may be incorporated with a rearview mirror assembly 38 that may be configured to display images of the exterior 16 of the vehicle 12, such as a rear portion of the exterior 16 of the vehicle 12. As illustrated, the image processing system 10 may be configured to receive image data associated with the image captured by the imager 20. The image data may be processed in individual segments, or rows 40, such as the vertical row 40 illustrated in FIG. 2. Although illustrated as a five-unit-wide row 40, the sizing of the row 40 may vary in other examples of the present disclosure. In general, scanning of the pixel/image data may be completed in one or both directions 42, 44 of the display 34, such as laterally 42 and vertically 44.

As previously discussed, the system 10 may provide for the detection and correction of one or more faulty pixels or target pixels 60 of the imager 20 and may simulate the image data associated with the target pixel 60 for demonstration on the display 34. In operation, the controller 36 may detect the failure of one or more photosensor pixels of the pixel array 48 in response to read-out signals indicating one or more failures. Examples of photosensor pixel failures may include a dead pixel, a stuck pixel, or other permanent or temporary failures attributed to the detection of the image data representing a scene as captured by the imager 20. Such failures may result from a photodiode that has stopped receiving power, pixels that fail to change color or brightness, etc. The controller 36 may detect such faults as specific addresses associated with pixels in the pixel array 48 that generally fail to respond by changing readout signals over time or fail to readout dynamic or change values similar to a group of adjacent or proximate pixels over time.

The detection or one or more faulty pixels of the pixel array may be detected by the controller 36 primarily by monitoring the readout values over time. For example, faulty operation of one or more photosensor pixels may be detected in response to a failure to change dynamically in response to changing readout values in a region of a field of view as compared to one or more pixels in the same region or block. In some cases, a color or luminance of one or more of the pixels may fail to change in response to dynamic conditions identified by one or more neighboring pixels over time. By monitoring the output readings associated with the operation of each of the photosensor pixels in the pixel array 48, the controller 36 may identify one or more pixels that fail to change over time or change differently than nearby associated pixels and a tribute such non-conforming behavior as an indication that the pixel in the array has failed or is otherwise blocked due to contamination or debris associated with the camera apparatus. Such a fault status may be monitored at desired frequency. In response to a detection of a fault condition, the controller 36 may identify the address of the corresponding pixel as having failed and identify the pixel as a target pixel 60 for pixel correction.

Still referring to FIG. 2, an example of a correction or simulation of the image data associated with the target pixel 60 is described in further detail. As exemplarily shown, the image data is processed vertically 44, with a kernel 46 being applied to the image data sequentially from a top of the image to a bottom of the image and row-by-row. The kernel 46 may be employed to scan the pixel data and store the pixel data in the blocks 30 of BRAM 28. For example, the kernel 46 may be a convolution matrix, or a mask, that captures a specific area (e.g., a 3×5-unit area of pixels) of a pixel array 48, including at least one line buffer 49, of the image data. Based on the pixel data stored in the BRAM 28, a target pixel 60 associated with a defect in the imaging apparatus 18 (e.g., a damaged or dust-covered photosensor) may be updated to reflect a likely representation of an object of the captured image. The target pixel 60 shown and described may be referred to as a "dead" or "defective" pixel due to its association with a bad, dead, or defective portion of the imager 20.

In the illustrated example, the area scanned by the kernel 46 is a 5×5 pixel array 48 of the row 40 that has a first region 50 and a second region 52 that overlaps the first region 50 at an overlapping region 54. The overlapping region 54 may be a bottom line of a 3×5 matrix (e.g., the kernel 46) that is scanned or passed by the kernel 46 in two scans 56, 58. In a first scan 56 by the kernel 46, pixels in the range of (0,0) through (3,5) are scanned and the corresponding image data is stored in the BRAM 28. For example, an intensity associated with the red pixel at (0,0) in the pixel array 48 may be stored in a 32-bit word along with the brightness or intensity of some or all of other pixels in the 3×5 kernel 46. In addition to individual pixel values, an average, or weighted average, of pixels having a similar type (e.g., color) for the kernel 46 region may be stored in the 32-bit word or another word stored in the BRAM 28. In this way, for pixels associated with a defective photosensor (e.g., the target pixel 60 at (3,3)) an average of the surrounding red pixels may be employed to adjust or correct the pixel value associated with the target pixel 60. For example, the pixels at positions (0,0), (0,2), (0,4), (2,0), and (2,4) may be averaged, or otherwise statistically correlated with a target value for the target pixel 60 following the first scan 56. The target value may then be incorporated by the image processor 24 to manipulate the image data to output pixel data that differs from the value captured at the imager 20.

With particular reference to the second pass 58 of the kernel 46 over the pixel array 48, the second region 52 may include pixels between the range of (2,0) through (4,4) and may overlap with the first region 50 by the common overlapping region 54. Similar to the process following the first scan 56, surrounding pixels in the second region 52 with pixel data having a type common to the target pixel 60 may be incorporated by the image processor 24 to adjust the target pixel 60 to the target value. In this way, the target value may be updated based on the pixel data gathered in the second pass 58. For example, pixel data associated with the pixels at positions (2,0), (2,4), (4,0), (4,2), and (4,4) may be incorporated into an algorithm employed by the processor to adjust the target value to correct the target pixel 60.

Once the pixel data of the pixels having a type (e.g., color) common to the type of the target pixel 60 is determined from both the first scan 56 and a second scan 58, a weighted average of this value (e.g., a brightness, an intensity, and amounts/quantity) may be assigned as the target value. By overlapping the first scan 56 and the second scan 58 along the common overlapping region 54 that incorporates the target pixel data twice, the "good" pixels in the pixel array 48 may be used to compensate for the "defective" target pixel 60. Further, the amount of image data stored in the BRAM 28 may be less than the amount of image data required to be stored in the BRAM 28 if the kernel 46 were larger (e.g., a 5×5 area). In this way, the image processing system 10 of the present disclosure may provide for a more efficient and robust image correction process.

In some examples, the algorithm employed may be a hybrid algorithm that, between the first pass 56 and the second pass 58, causes the BRAM 28 to store the total values of the surrounding like-type pixel data in a 32-bit word, along with information specifying how many pixels have been scanned (e.g., how many red pixels have been scanned). During the second scan 58, (after two line buffers 49 have been passed in the first scan 56), the kernel 46 may capture pixel values associated with the additional like-type pixels of the second region 52 in the second scan 58, and the values of these like-type pixels may be added to the 32-bit word, along with the number of additional pixel scanned, thereby forming an aggregate sum of the two regions 50, 52. The image processor 24 may then calculate (e.g., by division) an average value for the 5×5 pixel array 48 scanned twice by the kernel 46. In this way, the target value may be updated to incorporate a weighted average of the two scans and capture a wider range of good pixels than may be possible by a 3×5 kernel 46 that does not include the overlapping region 54.

Although not exemplarily illustrated, it is contemplated that like—type pixels surrounding the "defective" target pixel 60 may also be associated with defective photosensors. Thus, surrounding pixels may not always be reliable for computation of the target value. The image processing technique may account for such defects by omitting the values of these dead pixel values in an average or other calculation to determine the target value. In addition, by employing a two-scan approach, a sufficient amount of like-type pixel data may be gathered to adequately correct the "defective" target pixel 60. Stated differently, advantages of employing a larger kernel size may be ascertained without using as much storage/memory that would be required for a 5×5 kernel. In fact, the two-scan approach and corresponding methods described herein may limit the memory requirements to six blocks 30 of BRAM 28 for a 1920-pixel long width or height of the display 34. For example, three lines of pixels (e.g., two line buffers 49 and the overlapping line 54) each consuming two blocks 30 of BRAM 28 may be stored per scan of a row of pixels along either the lateral direction 42 or the vertical direction 44 for a 1920-pixel width or height. In contrast, a 5×5 kernel may consume ten blocks 30 of BRAM 28 for a similar scan of a similarly-sized display due to five lines of pixels being captured per scan.

Figure 3:
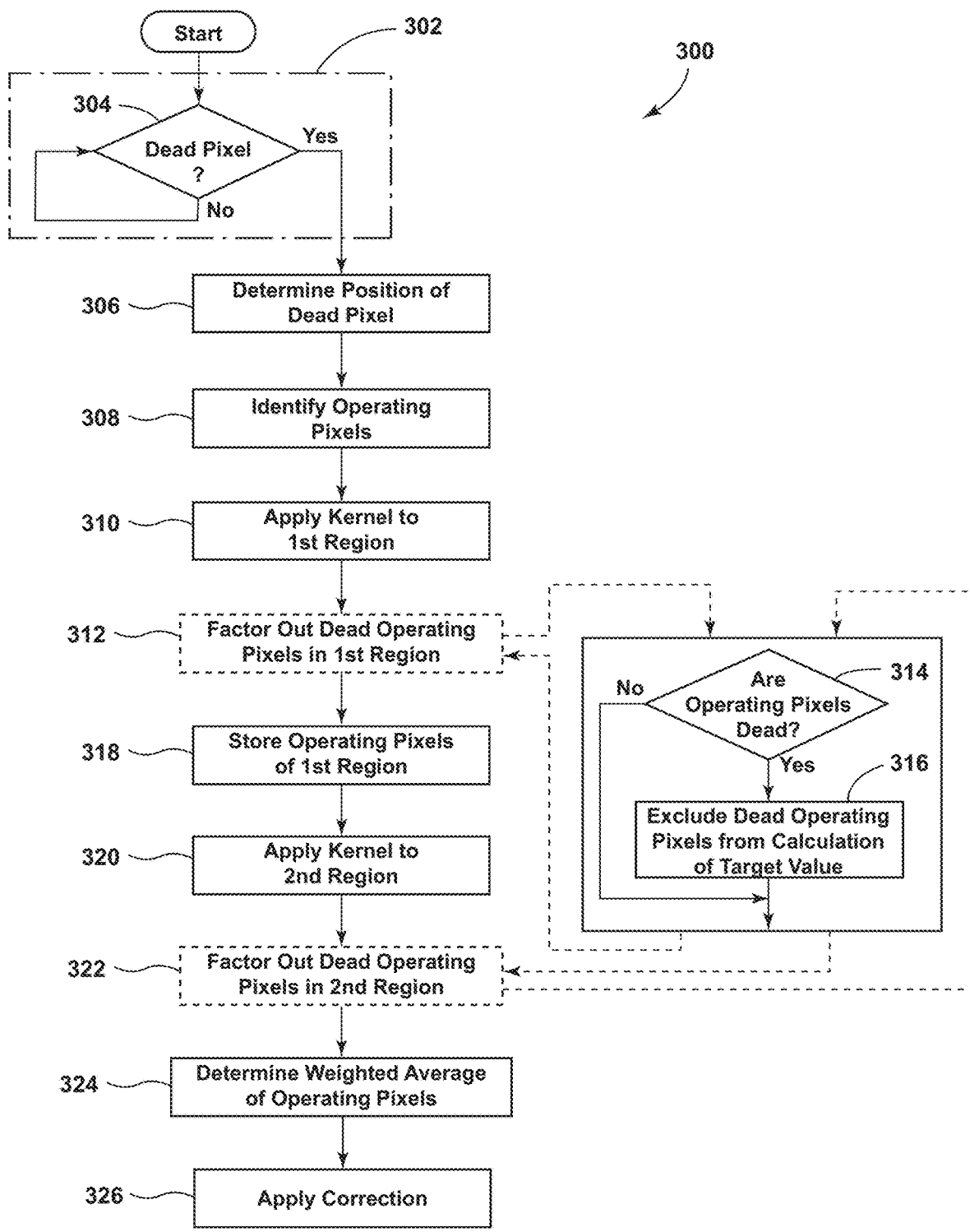
FIG. 3 is a flow diagram of a method for correcting pixels of a display according to one aspect of the present disclosure.

Referring now to FIG. 3, a method for correcting pixels for a display includes a process 302 for identifying "dead" pixels (e.g., the target pixel 60). Within the process 302, the method 300 checks for the presence of dead pixels at step 304, and if any are detected, the method 300 proceeds to determining the position of the dead pixel(s) based on the image data at step 306. The dead pixel identification routine may employ sensor pattern noise detection and/or other image processing techniques that may associate consistent pixel values that do not correspond with surrounding pixel values with a dead pixel. The image processor 24 may then determine a position of the defective photosensor and, thereby, determine a position of the dead pixel 60.

At step 308, operating pixels proximate to the target/dead pixel 60 may be identified by the image processor 24, and the operating pixels may have a color common to the target pixel 60. In the example illustrated in FIG. 2, the red pixels that surround the target pixel 60 may be the operating pixels due to having a color common to the color of the target pixel 60. At step 310, the kernel 46 may be applied to the first region 50 of the image data that overlaps the location of the target pixel 60. At step 312, operating pixels in the first region 50 that are also defective or dead may be factored out of the calculation for determining a value for the target pixel 60 via steps 314 and 316. Once the dead operating pixels of the first region 50 are removed from a calculation of a target value for the target pixel 60, the method 300 may continue to step 318, where the average value of the operating pixels of the first region 50 are stored in a memory. For example, the average value may be stored in a 32-bit word in the BRAM 28 blocks 30.

At step 320, the kernel 46 may be applied to the second region 52 of the image data that overlaps the location of the target pixel 60. For example, the overlapping region 54 illustrated in FIG. 2 may be scanned twice by the kernel 46. At step 322, operating pixels in the second region 52 that are defective or dead may be factored out of the calculation for determining a value for the target pixel 60 via steps 314 and 316. At step 324, the weighted average of the operating pixel may be determined based on the average value and the values of the operating pixels in the second region 52. At step 326, a correction, update, or offset to the target pixel 60 may be applied based on the weighted average to generate a simulated pixel value in the image data. The simulated pixel value may ensure that the location of the target pixel as represented on the display 34 is similar to the surrounding pixels and dynamically changes as the operating pixels proximate to the location of the target pixel 60 change over time.

The correction could include assigning the weighted average to the target pixel 60. In this way, a target value for the pixel may be applied based on the weighted average to correct the target pixel 60. The target value may be a brightness level, an intensity, or the like that may correspond to a specific color that corresponds to the pixels. Although the example illustrated in FIG. 2 is described in relation to a red pixel, the image correction technique may be applied to green, blue, or other-colored pixels. It is also contemplated that the brightness levels associated with surrounding pixels that are not like-type may also be incorporated in other examples.

In general, the size (e.g., resolution) of the images captured by the imager 20 and/or the capacity of the image processor 24 may influence how much memory may be freed up by employing the algorithm of the present disclosure. For example, the particular display 34 employed may have a resolution in the range of between 16 and 15,360 pixels by between 16 and 15,360 pixels, or any combination thereof. Other resolutions exceeding such ranges may also be utilized for the image processing techniques of the present disclosure. Further, the FPGA 26 may include any quantity of BRAM 28 capable of storing image data in such resolution ranges, and the amount of memory freed up may be proportional or scalable to the particular resolution. In one example in which each row 40 is up to 1920 pixels long, a total of four blocks 30 of BRAM 28 may be freed up for other image processing techniques. For example, two blocks 30 of BRAM 28 per row 40 may be saved compared to implementation of a 5×5 non-overlapping kernel 46. For images having greater resolution than 1920 pixels (e.g., 4K resolution) and/or for different-sized (e.g., larger) image processors 24, more blocks 30 of BRAM 28 may be saved according to the algorithm of the present disclosure. Similarly, the present algorithm may free up less blocks 30 of BRAM 28 for resolutions and/or smaller-sized image processors 24 than systems for processing and presenting images with lesser resolution than 1920 pixels. Accordingly, the algorithm employed by the present disclosure may be scaled to account for differing imager resolutions. It is further contemplated that the image processor 24 may employ additional kernels 46 for other image processing on the images prior to presentation at the display 34. In general, by requiring less BRAM 28 for image processing, smaller and/or less complex FPGAs 26 may be employed, thereby resulting in a more efficient image processing apparatus.

According to some aspects of the disclosure, a method for correcting image data captured by a photosensor array comprises receiving, at a processor, image data associated with an image captured by the photosensor array and determining, by the processor, a location of a target pixel in the photosensor array associated with a defect of the imager. The method then identifies the first operating pixels in a first region of the photosensor array that overlaps the location of the target pixel and the second operating pixels in a second region of the photosensor array that overlaps the location of the target pixel and a portion of the first region. A simulated pixel value is determined for the target pixel in response to a weighted average of the of the first operating pixels and the second operating pixels. The simulated pixel value is then assigned to the target pixel in the image data.

According to various aspects, the disclosure may implement one or more of the following features or configurations in various combinations:

the method is applied by a kernel operated by the processor;

the simulated pixel value is determined by calculating a first sum of a plurality of first pixel values for the operating pixels in the first region;

the simulated pixel value is further determined by storing, in a memory, the first sum and a first count of the operating pixels in the first region;

the simulated pixel value is determined by identifying a plurality of second pixel values for the operating pixels in the second region;

determining the simulated pixel value as a weighted average based on the sum, the first count of the operating pixels in the first region, and values of operating pixels in the second region;

the assigning of the simulated pixel value comprises applying a correction to a target pixel value of the target pixel based on the weighted average;

the weighted average is a brightness level;

calculating a second sum of second pixel values for the operating pixels in the second region;

determining a second count of operating pixels in the second region, wherein determining the weighted average is further based on the second sum and the second count of the operating pixels in the second region;

the location of the target pixel is identified in response to detecting at least one pixel fault in an array of photosensor pixels based on the image data;

the at least one pixel fault is detected in response to a first readout value of the location of one of the operating pixels failing to conform to a plurality of second readout values associated with other operating pixels spatially proximate to the one of the operating pixels; and/or the at least one pixel fault is detected in response to a pixel readout value of the location of one of the operating pixels failing to change over time.

According to another aspect of the invention, a system for correcting image data comprises an imager configured to capture the image data, a display configured to present the image data, and an image processor in communication with the display and the imager. The image processor is configured to receive the image data and determine a location of a target pixel in the display associated with a defect of the imager. The processor may then identify first operating pixels in a first region of the photosensor array that overlaps the location of the target pixel and second operating pixels in a second region of the photosensor array that overlaps the location of the target pixel and a portion of the first region. A simulated pixel value is then determined for the target pixel in response to a weighted average of the of the first operating pixels and the second operating pixels. The imager can then display the simulated pixel value to the target pixel in the image data on the display.

According to various aspects, the disclosure may implement one or more of the following features or configurations in various combinations:

the simulated pixel value is determined by calculating a first sum of a plurality of first pixel values for the operating pixels in the first region;

storing the first sum and a first count of the operating pixels in the first region;

the simulated pixel value is determined by calculating a second sum of a plurality of second pixel values for the operating pixels in the second region;

storing the second sum and a second count of the operating pixels in the second region;

the simulated pixel value is determined as a weighted average based on the first sum, the first count, the second sum of the operating pixels in the first region, and the second sum and second count of operating pixels in the second region;

the assignment of the simulated pixel value to the target pixel in the image data comprises applying a correction to a target pixel value of the target pixel based on the weighted average; and/or the determination of the location of the target pixel is identified in response to detecting at least one pixel fault in an array of photosensor pixels based on the image data.

According to yet another aspect of the invention, a system for correcting image data received from an imager comprises a display configured to present the image data and a processor in communication with the display and the imager. The processor receives the image data from a plurality of operating pixels forming the image data and determines a location of a target pixel in the display associated with a defect of the imager. Then the processor then calculates a first sum of a first count of a plurality of first pixel values for the operating pixels in a first region that overlaps the location and stores the first sum and a first count of the operating pixels in the first region. A second sum is calculated for a second count of a plurality of second pixel values for the operating pixels in a second region that overlaps the location and a portion of the first region. The processor then calculates a weighted average based on the first sum, the first count, the second sum, and the second count. A simulated pixel value is then generated for the target pixel based on the weighted average. A simulated pixel value is displayed in the location of the image data on the display.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A method for correcting image data captured by a photosensor array, the method comprising:
receiving, at a processor, image data associated with an image captured by the photosensor array;
determining, by the processor, a location of a target pixel in the photosensor array associated with a defect of the imager;
identifying first operating pixels in a first region of the photosensor array that overlaps the location of the target pixel;
identifying second operating pixels in a second region of the photosensor array that overlaps the location of the target pixel and a portion of the first region;
determining a simulated pixel value for the target pixel in response to a weighted average of the first operating pixels and the second operating pixels; and
assigning the simulated pixel value to the target pixel in the image data, wherein the location of the target pixel is identified in response to detecting at least one pixel fault in the photosensor array in response to a first readout value of the location of one of the first and second operating pixels failing to conform to a plurality of second readout values associated with other operating pixels spatially proximate to the one of the first and second operating pixels.

2. The method according to claim 1, wherein the method is applied by a kernel operated by the processor.

3. The method according to claim 1, wherein the simulated pixel value is determined by calculating a first sum of a plurality of first pixel values for the operating pixels in the first region.

4. The method according to claim 3, wherein the simulated pixel value is further determined by storing, in a memory, the first sum and a first count of the operating pixels in the first region.

5. The method according to claim 4, wherein the simulated pixel value is determined by identifying a plurality of second pixel values for the operating pixels in the second region.

6. The method according to claim 5, further comprising:
determining the simulated pixel value as a weighted average based on the sum, the first count of the operating pixels in the first region, and values of operating pixels in the second region.

7. The method according to claim 6, wherein the assigning of the simulated pixel value comprises applying a correction to a target pixel value of the target pixel based on the weighted average.

8. The method of claim 6, wherein the weighted average is a brightness level.

9. The method of claim 6, further comprising:
calculating a second sum of second pixel values for the operating pixels in the second region.

10. The method of claim 4, further comprising:
determining a second count of operating pixels in the second region, wherein determining the weighted average is further based on the second sum and the second count of the operating pixels in the second region.

11. The method according to claim 1, wherein the at least one pixel fault is detected in response to a pixel readout value of the location of one of the operating pixels failing to change over time.

12. A system for correcting image data, the system comprising:
an imager configured to capture the image data;
a display configured to present the image data; and
an image processor in communication with the display and the imager, the image processor configured to:
receive the image data;
determine a location of a target pixel in the display associated with a defect of the imager, wherein the determination of the location of the target pixel is identified in response to detecting at least one pixel fault in an array of photosensor pixels based on the image data;
identify first operating pixels in a first region of the photosensor array that overlaps the location of the target pixel;
identify second operating pixels in a second region of the photosensor array that overlaps the location of the target pixel and a portion of the first region;
determine a simulated pixel value for the target pixel in response to a weighted average of the first operating pixels and the second operating pixels; and
display the simulated pixel value to the target pixel in the image data on the display, wherein the at least one pixel fault is identified in response to a first readout value of the location of one of the first and second operating pixels failing to conform to a plurality of second readout values associated with other operating pixels spatially proximate to the one of the first and second operating pixels.

13. The system according to claim 12, wherein the simulated pixel value is determined by calculating a first sum of a plurality of first pixel values for the operating pixels in the first region; and storing the first sum and a first count of the operating pixels in the first region.

14. The system according to claim 13, wherein the simulated pixel value is determined as a weighted average based on the first sum, the first count, the second sum of the operating pixels in the first region, and the second sum and second count of operating pixels in the second region.

15. The system according to claim 14, wherein the assignment of the simulated pixel value to the target pixel in the image data comprises applying a correction to a target pixel value of the target pixel based on the weighted average.

16. The system according to claim 12, wherein the simulated pixel value is determined by calculating a second sum of a plurality of second pixel values for the operating pixels in the second region; and storing the second sum and a second count of the operating pixels in the second region.

17. The system according to claim 12, wherein the determination of the location of the target pixel is identified in response to detecting at least one pixel fault in an array of photosensor pixels based on the image data.

18. A system for correcting image data received from an imager, the system comprising:
a display configured to present the image data; and
a processor in communication with the display and the imager, the processor configured to:
receive the image data from a plurality of operating pixels forming the image data;
determine a location of a target pixel in the display associated with a defect of the imager;
scan a first region of the operating pixels that overlaps the location in a first pass identifying a plurality of first pixels values;
calculate a first sum of a first count of a plurality of first pixel values;
storing the first sum and a first count of the operating pixels in the first region;
scan a second region of the operating pixels that overlaps the location and a portion of the first region in a second pass identifying a plurality of second pixels values;
calculate a second sum of a second count of a plurality of second pixel values;
calculate a weighted average based on the first sum, and the first count from the first pass and the second sum, and the second count from the second pass;
generate a simulated pixel value for the target pixel based on the weighted average; and
display a simulated pixel value in the location of the image data on the display.

* * * * *